(12) United States Patent
Chathukutty et al.

(10) Patent No.: US 10,341,615 B2
(45) Date of Patent: Jul. 2, 2019

(54) SYSTEM AND METHOD FOR MAPPING OF TEXT EVENTS FROM MULTIPLE SOURCES WITH CAMERA OUTPUTS

(75) Inventors: Silky Chathukutty, Bangalore (IN); Vijay Dhamija, Bangalore (IN); Marine Drive, Bangalore (IN); Chaithanya Holla, Bangalore (IN); Jeetendra Kumar Mallireddy, Bangalore (IN); Arun Pattali, Bangalore (IN); Sandeep Pundlik, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1934 days.

(21) Appl. No.: 12/044,528

(22) Filed: Mar. 7, 2008

(65) Prior Publication Data
US 2009/0225163 A1 Sep. 10, 2009

(51) Int. Cl.
*H04N 7/18* (2006.01)
*G08B 13/196* (2006.01)

(52) U.S. Cl.
CPC ....... *H04N 7/181* (2013.01); *G08B 13/19645* (2013.01); *G08B 13/19671* (2013.01); *H04N 7/185* (2013.01)

(58) Field of Classification Search
CPC .. H04N 7/181; H04N 7/185; G08B 13/19645; G08B 13/19671
USPC .......................................................... 348/143
See application file for complete search history.

(56) References Cited

U.S. PATENT DOCUMENTS

| | | | | |
|---|---|---|---|---|
| 4,326,218 A * | 4/1982 | Coutta | ................... | G07G 3/003 348/150 |
| 4,630,110 A * | 12/1986 | Cotton | ................... | G07G 3/003 200/86 R |
| 4,991,008 A * | 2/1991 | Nama | ................ | G07C 9/00079 235/379 |
| 5,128,755 A * | 7/1992 | Fancher | ........... | G08B 13/19621 348/143 |
| 5,491,511 A * | 2/1996 | Odle | ................ | G08B 13/19669 348/153 |
| 5,956,081 A * | 9/1999 | Katz | ...................... | H04N 7/181 348/159 |
| 6,438,696 B1 * | 8/2002 | Baran et al. | ..................... | 726/22 |
| 7,304,662 B1 * | 12/2007 | Sullivan et al. | ............. | 348/150 |
| 2002/0140819 A1 * | 10/2002 | Waehner et al. | .......... | 348/207.1 |

(Continued)

*Primary Examiner* — Allen C Wong
(74) *Attorney, Agent, or Firm* — Seager, Tufte & Wickhem LLP

(57) ABSTRACT

A system and method for mapping of text events from multiple sources with camera outputs is provided. The system includes a CCTV keyboard for assigning each surveillance camera to one or more zones containing one or more point of transaction devices; a capture section for receiving data from one of the one or more transaction devices when the capture section receives a data request command from the CCTV keyboard; and a CCTV switching system for displaying video from the at least one or more surveillance cameras and data from the transaction device. The method assigns each surveillance camera to one or more zones containing one or more transaction devices; receives data from one of the one or more transaction devices when the data request command is received; and displays video from the at least one or more surveillance cameras and data from the transaction device.

18 Claims, 2 Drawing Sheets

(56) References Cited

U.S. PATENT DOCUMENTS

| | | | |
|---|---|---|---|
| 2003/0098910 A1* | 5/2003 | Kim | G06Q 20/20 348/150 |
| 2003/0197782 A1* | 10/2003 | Ashe et al. | 348/150 |
| 2004/0130623 A1* | 7/2004 | Han | 348/150 |
| 2004/0136388 A1* | 7/2004 | Schaff | G08B 13/19656 370/401 |
| 2004/0212679 A1* | 10/2004 | Jun | 348/159 |
| 2005/0012818 A1* | 1/2005 | Kiely et al. | 348/143 |
| 2005/0046697 A1* | 3/2005 | VanCleave et al. | 348/150 |
| 2005/0132414 A1* | 6/2005 | Bentley | G08B 13/19606 725/105 |
| 2005/0177859 A1* | 8/2005 | Valentino, III | G08B 13/19656 725/105 |
| 2005/0259848 A1* | 11/2005 | Garoutte | 382/103 |
| 2006/0279628 A1* | 12/2006 | Fleming | 348/143 |
| 2008/0050092 A1* | 2/2008 | Erickson | G08B 13/19671 386/245 |
| 2008/0136896 A1* | 6/2008 | Graham | H04N 7/15 348/14.08 |
| 2008/0199155 A1* | 8/2008 | Hagens et al. | 386/124 |
| 2008/0208698 A1* | 8/2008 | Olson | G06Q 20/20 705/21 |
| 2009/0220206 A1* | 9/2009 | Kisliakov | 386/52 |

\* cited by examiner

SYSTEM AND METHOD FOR MAPPING OF TEXT EVENTS FROM MULTIPLE SOURCES WITH CAMERA OUTPUTS

FIELD OF THE INVENTION

The present invention relates generally to video recording and more specifically to a system and method for mapping text events from multiple sources with camera outputs.

BACKGROUND OF THE DISCLOSURE

Surveillance operators typically use a closed circuit TV (CCTV) monitoring system to monitor an area under surveillance for any suspicious activity through fixed or pan-tilt-zoom (PTZ) cameras. In areas where the operator might suspect something suspicious, i.e. at point-of-sale devices, ATMs, slot machines and gaming tables, etc., (collectively these devices are referred to hereinafter as transaction devices) the operator may need to view the transactions being generated in the area and/or by the monitored devices to confirm a fraudulent activity or theft.

A limitation to the conventional CCTV monitoring system is that if a tampering or software malfunction has occurred at the device, the operator is not notified through the CCTV monitoring system. Instead, the operator needs to use other applications that interface with and capture transactions from these devices and link the transactions with the CCTV video. However, it is not feasible for an operator to stop the current monitoring and go to other applications to view transaction events, thus this type of tampering can now only be detected at a later stage when a detailed report is generated by the application capturing the events and verified with video content. Such a surveillance workflow requires time and extra effort. In addition, by not identifying the tampering as it is occurring, there is a greater chance that the perpetrator may avoid capture altogether.

SUMMARY OF THE DISCLOSURE

An embodiment of the present invention includes a CCTV keyboard for assigning each surveillance camera to one or more zones containing one or more transaction devices; a capture section for receiving data from one of the one or more transaction devices when the capture section receives a data request command from the CCTV keyboard; and a CCTV switching system for displaying video from the at least one or more surveillance cameras and data from the transaction device.

Another embodiment of the present invention includes the steps of assigning each surveillance camera to one or more zones containing one or more transaction devices; receiving data from one of the one or more transaction devices when a data request command is received; and displaying video from the at least one or more surveillance cameras and data from the transaction device.

Another embodiment of the present invention includes a non-transitory computer readable medium embodying instructions executable by a processor for performing a method for generating side-by-side video and text for video surveillance. The method includes the steps of assigning each surveillance camera to one or more zones containing one or more transaction devices, receiving data from one of said one or more transaction devices when a data request command is received and displaying video from said at least one or more surveillance cameras and data from said transaction device.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
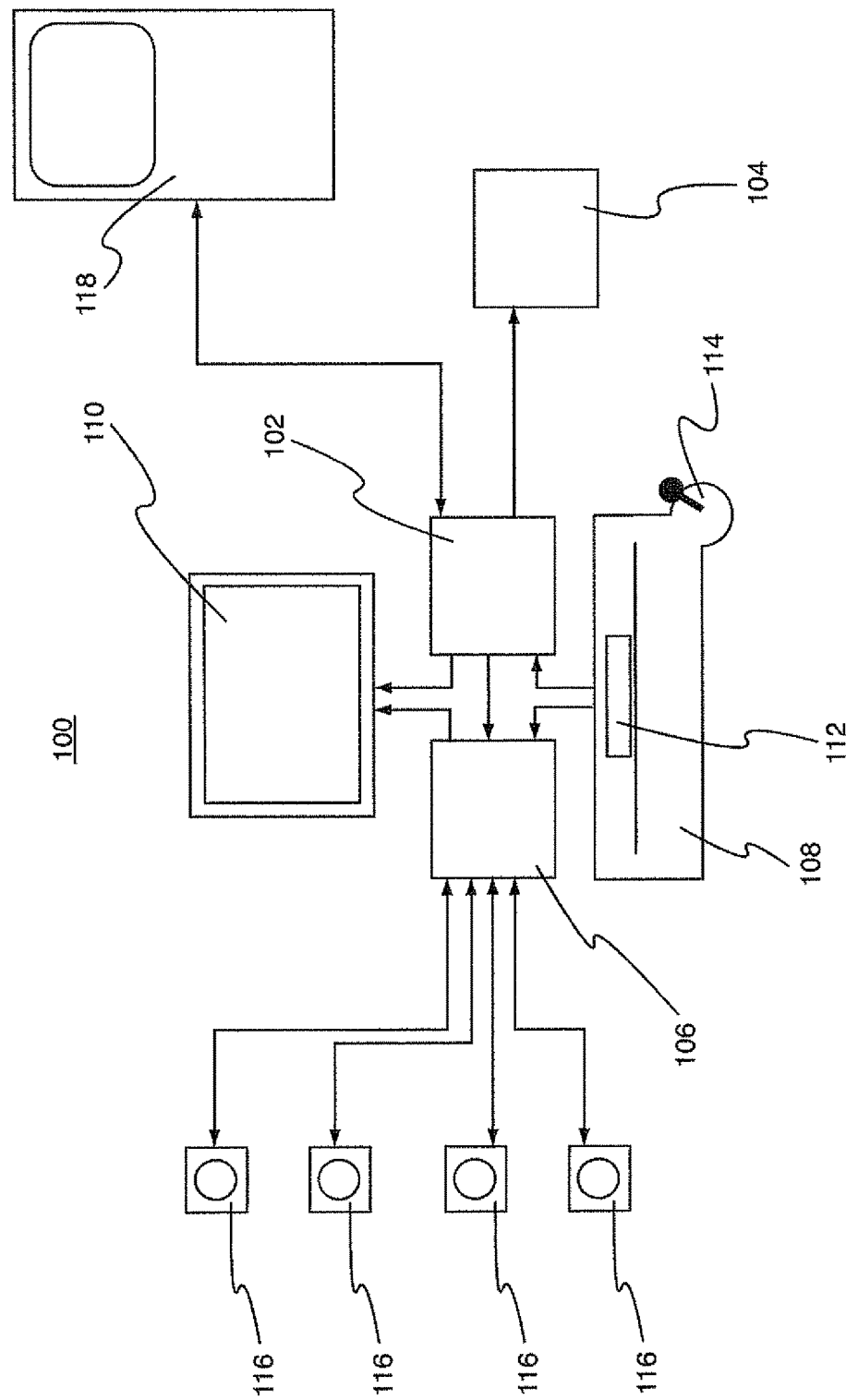
FIG. 1 illustrates a block representation of an embodiment of the present invention.

An embodiment of the present invention as shown in FIG. 1 provides a CCTV controller that provides the operator with the ability to view transaction data on demand. A capture section 102 captures transaction data from a point-of-sale device, slot machine, gaming table or any other similar device and stores it in a storage unit 104. Additionally, the capture section 102 transmits the capture data to a CCTV switching unit 106. A CCTV keyboard 108 is provided with an interface for retrieving device events at the request of the operator. The interface may be a keyboard button, dial, or other interface device known in the art. Additionally, the CCTV keyboard 108 is equipped with a display screen 112 for displaying user selectable menus for selecting various options and settings.

Also, the CCTV keyboard 108 is equipped with a controller for providing control signals to the capture section 102 and the CCTV switching unit 106.

With the present embodiment, the operator can immediately choose to view the transaction data at a device where suspicious activity is observed by interacting with the display 112 and interface. The operator can create data files containing video clips and/or the transaction data and other text such as operator comments. The video clips and transaction data mat be stored in separate data files or combined into one data file. The data files are stored in a storage device 104, such as a hard disk, VCR, DVD, solid-state memory or other appropriate storage device.

In order to identify the device for which the data has to be shown, an embodiment of the present invention groups one or more monitored devices 118 with one or more cameras 116 in a zone. A zone may be a physical location such as a hallway or room. Alternatively, the one or more cameras 116 may be grouped using abstract criteria such as ownership of the monitored space. For example, the zones can be named as pool-side bar, food court, and so on. Each of these zones can have one or more point-of-sale or other devices in it; and each of these devices can be given an understandable logical name. These configurations can be performed through the CCTV keyboard 108 of the present invention.

When the operator requests for a video playback from the CCTV keyboard 108, the operator can choose to view the transaction data for that video using a menu driven interface provided by the CCTV keyboard 108. In this case the CCTV switching unit 106 sends a data request for a particular video frame timestamp to the capture section 102. The data received by the CCTV switching unit 106 is superimposed on the video and viewed on a video display device 110 or stored in the storage unit 104 as video clips. In addition to viewing previously stored transaction data and video clips, the operator can request to view current video and transaction data live as the transactions occur.

Moreover, the capture section 102 provides exception event notification received from the transaction devices 118 to the CCTV switching unit 106 along with other relevant device information from the device generating the exception. Exceptions refer to errors or faults, which are registered by the transaction device 118. These exceptions are transmitted to the capture section 104 regardless of whether data from the transaction device 118 is being currently viewed by the operator. CCTV keyboard 108 can be configured to automatically transmit a control signal to the CCTV switching unit 106 causing the CCTV switching unit 106 to switch to the camera 116 to which the transaction device 118 is assigned, and monitor the events on a video display device 110. CCTV keyboard 108 can identify the camera 116 from the zones/groups configuration mentioned above. A Preset zoom can be provided for each transaction device 118 along with the zone configuration. Further, when a camera 116 is viewed, all assigned transaction devices 118 can be viewed sequentially using scroll buttons (Up Arrow and Down Arrow) or dial.

Figure 2:
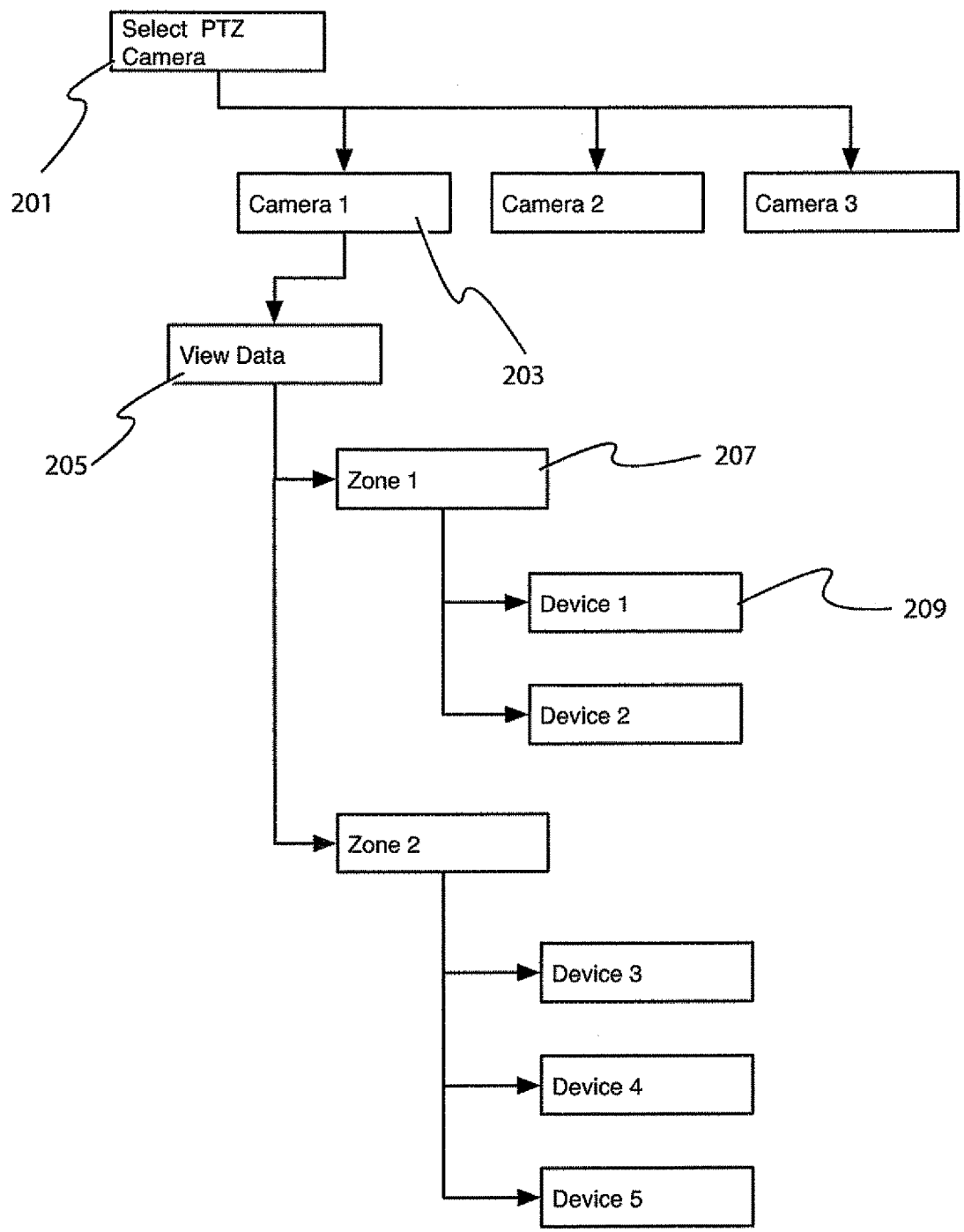
FIG. 2 illustrates a menu tree of an embodiment of the present invention.

In an embodiment of the present invention shown in FIG. 2, the operator can look at any device within the field of view of a selected camera, and request transaction data for it. Initially an operator selects a camera to view and control in the case of PTZ cameras by entering menu 201 and selecting one of the listed cameras 203, When an operator chooses to view the data from a transaction device, a menu containing zones/groups with which the camera is associated 205 is displayed on the LCD screen 112 of the CCTV keyboard 108. The menus are configured for display at the touch of a designated button on the CCTV keyboard 108, or by navigation and selection of menu items. Once a zone a zone is selected, the operator is provided with a menu listing the transaction devices in the selected zone 207. The operator can then choose a transaction device from which to receive transaction data by selecting one of the listed transaction devices 209. The capture section 102 receives the transaction data from the selected transaction device and transmits the data to the monitor 110.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A video surveillance system comprising:
   a CCTV keyboard having a controller that groups each of a plurality of surveillance cameras into a respective one of a plurality of zones, wherein each of the plurality of zones contains a respective one of a plurality of transaction devices within a respective field of view of a respective one of the plurality of surveillance cameras associated with the respective one of the plurality of zones, and wherein each of the plurality of zones is a respective physical location where the respective one of the plurality of transaction devices is located;
   a capture unit that receives transaction data from the plurality of transaction devices; and
   a switching unit connected to the CCTV keyboard that selectively switches between the plurality of surveillance cameras to display respective video from the respective one of the plurality of surveillance cameras associated with a first one of the plurality of zones in response to a first selection from the CCTV keyboard selecting the first one of the plurality of zones,
   wherein, responsive to the first selection, the capture unit and the switching unit display the respective video of live transactions from the respective one of the plurality of surveillance cameras associated with the first one of the plurality of zones,
   wherein, when the first one of the plurality of zones includes more than one of the plurality of transaction devices, the CCTV keyboard is configured to receive a second selection selecting a selected transaction device of the more than one of the plurality of transaction devices,
   wherein, responsive to the second selection, the capture unit and the switching unit display text corresponding to the transaction data associated with the live transactions from the selected transaction device superimposed on the respective video of the live transactions from the respective one of the plurality of surveillance cameras associated with the first one of the plurality of zones; and
   wherein superimposition of the text on the respective video of the live transactions includes placing the text corresponding to the transaction data associated with the live transactions on top of the respective video of the live transactions.

2. The video surveillance system as in claim 1 further comprising a storage unit for storing the respective video from the respective one of the plurality of surveillance cameras associated with each of the plurality of zones and the transaction data from the plurality of transaction devices.

3. The video surveillance system as in claim 2 wherein the storage unit is a recording medium readable by a video playback system.

4. The video surveillance system as in claim 2 wherein the storage unit is a computer-readable medium.

5. The video surveillance system as in claim 1 wherein, responsive to the capture unit receiving an exception from a respective one of the plurality of transaction devices included in the first one of the plurality of zones, the CCTV keyboard automatically transmits a control signal to the switching unit to display the respective video from the respective one of the plurality of surveillance cameras associated with the first one of the plurality of zones, and wherein the capture unit automatically receives the exception from the respective one of the plurality of first transaction devices includes in the first one of the plurality of zones.

6. The video surveillance system as in claim 1 wherein the CCTV keyboard provides a respective list of the plurality of transaction devices monitored by each of the plurality of surveillance cameras based on the respective one of the plurality of zones to which each of the plurality of surveillance cameras is assigned.

7. A method comprising:
   providing a CCTV keyboard having a controller;
   connecting the CCTV keyboard to a capture unit and to a switching unit, wherein the capture unit is connected to each of a plurality of transaction devices, and wherein the switching unit is connected to each of a plurality of surveillance cameras;
   assigning each of the plurality of surveillance cameras, via the CCTV keyboard, to a respective one of a plurality of zones, wherein each of the plurality of zones contains a respective one of the plurality of transaction devices within a respective field of view of a respective one of the plurality of surveillance cameras assigned to the respective one of the plurality of zones, and wherein each of the plurality of zones is a respective physical location where the respective one of the plurality of transaction devices is located;

the controller of the CCTV keyboard receiving a request from a user and, in response, the switching unit selecting a first surveillance camera of the plurality of surveillance cameras, wherein the first surveillance camera captures first video of a live transaction within a first zone of the plurality of zones associated with the first surveillance camera;

the controller of the CCTV keyboard providing a menu listing first transaction devices of the plurality of transaction devices within the first zone and receiving, from the user, a selection selecting one of the first transaction devices from the menu, wherein the one of the first transaction devices is associated with the first zone;

the capture unit receiving transaction data from the one of the first transaction devices;

responsive to the request, the capture unit and the switching unit displaying the first video of the live transaction from the first surveillance camera; and responsive to the selection, the capture unit and the switching unit displaying text corresponding to the transaction data received from the one of the first transaction devices superimposed on the first video.

8. The method as in claim 7 further comprising storing the first video and the transaction data.

9. The method as in claim 8 wherein the first video and the transaction data are stored on a recording medium readable by a video playback system.

10. The method as in claim 8 wherein the first video and the transaction data are stored on a computer-readable medium.

11. The method as in claim 7 further comprising:
the capture unit automatically receiving an exception from a second transaction device of the plurality of transaction devices within a second zone of the plurality of zones; and
responsive to receiving the exception, the controller of the CCTV keyboard automatically transmitting a signal to the switching unit to display second video from a second surveillance camera of the plurality of surveillance cameras associated with the second zone.

12. The method as in claim 7 further comprising providing a respective list of the plurality of transaction devices monitored by each of the plurality of surveillance cameras based on the respective one of the plurality of zones to which each of the plurality of surveillance cameras is assigned.

13. A non-transitory computer readable medium embodying instructions executable by a processor for performing a method for generating side-by-side video and text for video surveillance in a surveillance system having a CCTV keyboard with a controller, a video switching unit, and a capture unit, wherein the CCTV controller is connected to the video switching unit and to the capture unit, and wherein the video switching unit is connected to a plurality of surveillance cameras and the capture unit is connected to a plurality of transaction devices, the method comprising:
assigning each of the plurality of surveillance cameras to a respective one of a plurality of zones, wherein each of the plurality of zones contains a respective one of the plurality of transaction devices within a respective field of view of a respective one of the plurality of surveillance cameras assigned to the respective one of the plurality of zones, and wherein each of the plurality of zones is a physical location where the respective one of the plurality of transaction devices is located;

the controller of the CCTV keyboard receiving a request from a user and, in response, the video switching unit selecting a first surveillance camera of the plurality of surveillance cameras, wherein the first surveillance camera captures first video of a live transaction within a first zone of the plurality of zones associated with the first surveillance camera;

the controller of the CCTV keyboard providing a menu listing first transaction devices of the plurality of transaction devices within the first zone and receiving, from the user, a selection selecting one of the first transaction devices from the menu, wherein the one of the first transaction devices is associated with the first zone;

the capture unit receiving transaction data from the one of the first transaction devices;

responsive to the request, the video switching unit and the capture unit displaying the first video of the live transaction from the first surveillance camera; and responsive to the selection, the video switching unit and the capture unit displaying text corresponding to the transaction data received from the one of the first transaction devices superimposed on a portion of the first video.

14. The non-transitory computer readable medium as in claim 13, the method further comprising storing the first video and the transaction data.

15. The non-transitory computer readable medium as in claim 14 wherein the first video and the transaction data are stored on a recording medium readable by a video playback system.

16. The non-transitory computer readable medium as in claim 14 wherein the first video and the transaction data are stored on a computer-readable medium.

17. The non-transitory computer readable medium as in claim 13, the method further comprising:
the capture unit automatically receiving an exception from a second transaction device of the plurality of transaction devices associated with a second zone of the plurality of zones; and
responsive to receiving the exception, the controller of the CCTV keyboard automatically transmitting a signal to the video switching unit to display second video from a second surveillance cameras of the plurality of surveillance cameras associated with the second zone.

18. The non-transitory computer readable medium as in claim 13, the method further comprising providing a respective list of the plurality of transaction devices monitored by each of the plurality of surveillance cameras based on the respective one of the plurality of zones to which each of the plurality of surveillance cameras is assigned.

* * * * *